Patented June 27, 1944

2,352,425

UNITED STATES PATENT OFFICE 2,352,425

LEAD-FREE ENAMEL

Alden J. Deyrup, Westfield, N. J., assignor to E. I. du Pont de Nemours & Company, Wilmington, Del., a corporation of Delaware No Drawing. Application June 10, 1942, Serial No. 446,537

17 Claims. (Cl. 106—48)

This invention relates to certain improved lead-free glazes or fluxes of the type suitable for use in decorating glassware and ceramic ware. More particularly, this invention relates to certain new and improved flux compositions free from lead oxide and characterized by an exceptionally high content of aluminum oxide. They mature at relatively low temperatures, below about 1150° F., and have coefficients of expansion suitable to permit their use generally in place of the usual low-melting lead-containing glazes for the decoration of glassware and other ceramic materials.

The surfaces of glass and ceramic articles are frequently decorated by melting thereon a glaze composition. This enamel or color is usually pigmented by the addition of a ceramic pigment, and may or may not be rendered opaque by the presence of an opacifying agent. The glaze must be one which will melt and form an adherent coating at a temperature below that at which softening or deformation of the glass or ceramic article decorated would occur. In the past the lead silicates or lead borosilicates, i. e. enamels containing large quantities of lead oxide, have been used for this purpose. It is in this special field of low-melting glaze or enamel compositions, melting to form a glossy, adherent coating generally below 1150° F., particularly useful for the decoration of articles of glassware, that the novel lead-free high alumina compositions with which this invention is concerned find their principal utility.

While lead-free glazes have been utilized in the past for special purposes such, for example, as coating the surfaces of glass electric lamp envelopes (see U. S. patent to Goodwin, No. 2,247,196) or for use as an artglaze or overglaze in the manufacture of china and pottery, these enamels have not been usable generally to replace the usual low-maturing glazes of relatively high lead oxide content. As a general rule the lead-free glazes previously utilized, especially those glazes replacing the lead oxide partly by aluminum oxide, have had maturing temperatures and coefficients of expansion both much too high to permit their use in the decoration of glassware articles such as tumblers and glass tableware. Due to the great difficulty of securing a satisfactory low melting point and proper coefficient of expansion the use of these glazes has been restricted to special purposes in the decoration of ceramic articles commercially.

It is an object of this invention to develop leadless glazes suitable for application to glassware and ceramic articles, such glazes maturing below about 1150° F. and having coefficients of expansion such as to permit their application to articles made of glass such as tumblers or tableware. It is another object of this invention to prepare low-melting glazes or colors useful in this field which will contain relatively large amounts of aluminum oxide, amounts of $Al_2O_3$ greater than it was previously considered possible to use in lead-free enamels of this type. Still another object of my invention is the development of low-melting glazes suitable for application to glass tableware, which will be entirely free of lead compounds, thus eliminating the toxic hazard of lead present in enamel compositions which come into contact with foodstuffs. These and still further objects of the invention will become apparent from the ensuing detailed disclosure of certain preferred modifications thereof.

Surprisingly enough, I have found that when a relatively very high precentage of alumina is present in leadless fluxes of the composition ranges hereinafter described the resulting compositions have low-maturing temperatures and satisfactory low coefficients of expansion to permit of their use for forming a decorative coating on glass and ceramic ware in place of the usual high lead content, low-melting enamels. This is extraordinary, as aluminum oxide is universally regarded in the standard known ceramic art as increasing the viscosity and the refractory character of low-melting enamel compositions in which it is incorporated. In the past it had also been regarded as unsuitable for introduction in enamels utilized for decorating glassware, at least in any substantial amount, because its coefficient of expansion is the highest of any metallic oxide used in ceramics except the alkali metal oxides. For these reasons it has been used somewhat sparingly when used at all in glazes of this type, even when utilized as an ingredient in compositions whose maturing temperature and coefficient of expansion are less critical than those of glazes intended for application to glassware such, for example, as artglazes and special purpose enamels.

I have now found that when the aluminum oxide content of a lead-free, low-melting glaze is much higher than ever previously used or thought possible ever to use, an aluminum oxide mole percentage ranging from 12 to 17%, the resulting glazes have maturing temperatures and coefficients of expansion such as to permit their use for every purpose where ordinarily the low-maturing, high lead glazes would be employed. The mole per cent is the percentage ratio of the number of moles of aluminum oxide, $Al_2O_3$, present in the melting composition of the glaze to the total moles of all constituents present. For purposes of calculation, the number of moles is secured by dividing the number of grams of an oxide by the molecular weight of the oxide.

In addition to alumina, my improved glazes contain boric oxide, silica, one or more of the oxides of the alkali metals having an atomic weight below 40, and one or more of certain oxides having alkaline characteristics (generally alkaline earth oxides or allied metallic oxides) selected from the group which consists of barium oxide, strontium oxide, calcium oxide, magnesium oxide, and zinc oxide. The alkali metals having an atomic weight below 40 are lithium, sodium, and potassium, and the alkali metal oxide may be lithium oxide, sodium oxide, or potassium oxide, or any mixture of two or more of these metallic oxides. Generally lithium oxide is preferred because of its favorable effect in reducing the maturing temperature of the glaze.

The composition of my new and improved lead-free glazes or fluxes may be tabulated as follows:

TABLE I

| | Mole per cent |
|---|---|
| Aluminum oxide | 12 to 17 |
| Boric oxide | 25 to 40 |
| Silica | 5 to 25 |
| One or more of the alkali metal oxides of the alkali metals having atomic weights below 40 | 13 to 24 |
| One or more of the metal oxides: barium oxide, strontium oxide, calcium oxide, magnesium oxide, or zinc oxide | 6 to 20 |

In addition, there may be present in some instances titanium dioxide which, when melted as an ingredient of the enamel in amounts ranging from 1 to 7%, will improve the acid resistance of the flux. In some instances one or more coloring oxides such as cobalt oxide may also be present. The composition given is without the pigment or opacifying agent, these when present usually being added as a mill addition to the previously prepared glaze.

In preparing the lead-free flux compositions the procedure followed is generally the same as that utilized for preparing the ordinary low-melting glazes containing large amounts of lead oxide. This involves selecting ingredients which, when melted, will yield the composition desired, and then melting these ingredients to complete fusion. When titanium dioxide is present in order to improve the acid-resistant properties of the resulting glaze, in general a higher temperature will be necessary to bring this refractory oxide into solution. The molten glaze is then fritted, generally by pouring it into water. The resulting frit is then ground in a ball mill to a fine state of subdivision and, if a pigment or opacifying agent is to be present in the finished product, this is added during the milling stage. In use the resulting finely divided glaze is melted and applied to the ceramic object to be decorated, exactly as in the case of any other low-melting glaze composition.

The following table gives the compositions of various batches which may be melted to prepare my improved lead-free enamels. In this table the amounts of the various ingredients are given as weight percentages, based on the total weight of the entire batch.

TABLE II

| Ingredient | Enamel | | | | | | | | | | | | | | |
|---|---|---|---|---|---|---|---|---|---|---|---|---|---|---|---|
| | A | B | C | D | E | F | G | H | I | J | K | L | M | N | O |
| Boric acid, $H_3BO_3$ | 41.8 | 42.8 | 34.2 | 41.6 | 44.1 | 36.9 | 38.5 | 46.2 | 41.7 | 38.4 | 44.4 | 41.2 | 45.3 | 39.2 | 41.7 |
| Soda ash, $Na_2CO_3$ | | | | | | 4.6 | | | | | | | | 23.6 | 6.3 |
| Lithium carbonate, $Li_2CO_3$ | 12.6 | 12.8 | 12.8 | 8.3 | 16.6 | 11.0 | 11.5 | 13.9 | 12.5 | 11.6 | 13.4 | 12.4 | 13.6 | | 4.2 |
| Potassium carbonate, $2K_2CO_3.3H_2O$ | | | | | | | | | | | | | | | 8.3 |
| Kaolin, $Al_2O_3.2SiO_2.2H_2O$ | 31.3 | 18.2 | 25.6 | 10.4 | 22.1 | 18.4 | 19.2 | 23.2 | 20.8 | 19.2 | 22.2 | 20.6 | 22.7 | 19.6 | 20.8 |
| Barium carbonate, $BaCO_3$ | 6.3 | 6.4 | 7.7 | 9.4 | 3.3 | 5.5 | 23.1 | | | | | 12.4 | | | |
| Strontium nitrate, $Sr(NO_3)_2$ | 4.2 | 4.3 | 6.8 | 8.3 | 2.2 | 3.7 | | | 23.1 | | | | | | |
| Calcium carbonate, $CaCO_3$ | 2.1 | 2.1 | 3.4 | 4.1 | 1.1 | 1.8 | | | | 16.7 | | | | | |
| Magnesium carbonate, $MgCO_3$ | 1.7 | 1.7 | 2.7 | 3.3 | 1.8 | 1.5 | | 7.4 | | | | | 3.6 | | |
| Zinc oxide, ZnO | | | | | | 9.2 | | | | | 11.1 | 5.2 | 5.7 | 9.8 | 10.4 |
| Aluminum hydroxide, $Al(OH)_3$ | | 8.5 | 6.8 | 14.6 | 8.8 | 7.4 | 7.7 | 9.3 | 8.3 | 7.7 | 8.9 | 8.2 | 9.1 | 7.8 | 8.3 |
| Titanium dioxide, $TiO_2$ | | 3.2 | | | | | | | | | | | | | |

When melted, these batches will yield low-melting, lead-free glazes having the composition given in the following table. In this table the percentages of the various ingredients are expressed as mole percentages.

TABLE III

| Ingredient | Enamel | | | | | | | | | | | | | | |
|---|---|---|---|---|---|---|---|---|---|---|---|---|---|---|---|
| | A | B | C | D | E | F | G | H | I | J | K | L | M | N | O |
| Alumina, $Al_2O_3$ | 12.5 | 13.6 | 15.4 | 16.1 | 14.9 | 12.6 | 14.4 | 15.3 | 13.9 | 14.6 | 14.4 | 14.4 | 14.8 | 13.4 | 14.4 |
| Boric oxide, $B_2O_3$ | 35.0 | 37.8 | 29.9 | 40.6 | 37.4 | 31.5 | 36.4 | 38.2 | 34.8 | 36.6 | 36.2 | 36.1 | 37.2 | 33.8 | 36.4 |
| Silica, $SiO_2$ | 25.1 | 15.2 | 21.3 | 9.7 | 17.9 | 15.1 | 17.4 | 18.4 | 16.6 | 17.5 | 17.4 | 17.4 | 17.8 | 16.2 | 17.4 |
| Lithium oxide, $Li_2O$ | 17.7 | 18.8 | 18.6 | 13.5 | 23.6 | 15.7 | 18.2 | 19.2 | 17.5 | 18.5 | 18.3 | 18.3 | 18.7 | | 6.2 |
| Sodium oxide, $Na_2O$ | | | | | | 4.6 | | | | | | | | 23.8 | 6.4 |
| Potassium oxide, $K_2O$ | | | | | | | | | | | | | | | 5.4 |
| Barium oxide, BaO | 3.3 | 3.5 | 4.2 | 5.8 | 1.8 | 3.0 | 13.6 | | | | | 6.8 | | | |
| Strontium oxide, SrO | 2.1 | 2.2 | 3.5 | 4.7 | 1.0 | 1.8 | | | 12.8 | | | | | | |
| Calcium oxide, CaO | 2.2 | 2.3 | 3.7 | 4.9 | 1.2 | 1.9 | | | | 17.2 | | | | | |
| Magnesium oxide, MgO | 2.1 | 2.2 | 3.4 | 4.7 | 2.2 | 1.9 | | 8.9 | | | | | 4.4 | | |
| Zinc oxide, ZnO | | | | | | 11.9 | | | | | 13.7 | 7.0 | 7.1 | 12.8 | 13.8 |
| Titanium dioxide, $TiO_2$ | | 4.4 | | | | | | | | | | | | | |

NOTE.—All percentages are mole percentages.

In Table IV below, the compositions of Table III are given in percentages by weight:

Table IV
Enamels of Table III in per cent by weight

| Constituent | A | B | C | D | E | F | G | H | I | J | K | L | M | N | O |
|---|---|---|---|---|---|---|---|---|---|---|---|---|---|---|---|
| $B_2O_3$ | 36.4 | 38.5 | 30.5 | 38.7 | 40.5 | 31.7 | 33.1 | 42.6 | 38.5 | 36.7 | 37.7 | 35.2 | 40.0 | 32.7 | 35.0 |
| $Na_2O$ | | | | | | 4.1 | | | | | | | | 20.5 | 5.5 |
| $Li_2O$ | 7.9 | 8.2 | 8.2 | 5.6 | 10.9 | 6.9 | 7.0 | 9.1 | 8.2 | 7.9 | 8.1 | 7.5 | 8.6 | | 2.5 |
| $Al_2O_3$ | 19.2 | 20.3 | 23.0 | 22.6 | 23.5 | 18.4 | 19.1 | 25.0 | 22.2 | 21.3 | 22.0 | 20.4 | 23.4 | 18.8 | 20.2 |
| $K_2O$ | | | | | | | | | | | | | | | 7.0 |
| $SiO_2$ | 22.6 | 13.5 | 18.7 | 7.9 | 16.6 | 13.1 | 13.5 | 17.6 | 15.8 | 15.0 | 15.5 | 14.5 | 16.4 | 13.5 | 14.4 |
| BaO | 7.6 | 7.9 | 9.4 | 12.0 | 4.2 | 6.5 | 27.3 | | | | | 14.5 | | | |
| SrO | 3.2 | 3.3 | 5.2 | 6.8 | 1.8 | 2.7 | | | 19.1 | | | | | | |
| CaO | 1.9 | 1.9 | 3.0 | 3.8 | 1.0 | 1.5 | | | 15.3 | | | | | | |
| MgO | 1.2 | 1.3 | 2.0 | 2.6 | 1.5 | 1.1 | | 5.7 | | | | | 2.7 | | |
| ZnO | | | | | | 14.0 | | | | | 16.7 | 7.9 | 8.9 | 14.5 | 15.4 |
| $TiO_2$ | | 5.1 | | | | | | | | | | | | | |

It will be apparent that while I have described certain improved embodiments of my improved lead-free glaze composition suitable for use in decorating glass and ceramic ware, many changes and modifications thereof may be made without departing from the spirit or scope of my invention. Accordingly, the scope of my invention is to be construed in accordance with the prior art and appended claims, and is not to be restricted to the various conditions, details and proportions referred to as illustrative of its preferred embodiments.

I claim:

1. A lead-free, vitrifiable ceramic glaze composition suitable for decorating glassware and maturing below about 1150° F. to a glossy decorative surface coating, said glaze composition comprising aluminum oxide present in amounts ranging from 12 to 17 mole per cent; boric oxide present in amounts ranging from 25 to 40 mole percent; silica present in amounts ranging from 5 to 25 mole per cent; at least one of the oxides of an alkali metal having an atomic weight below 40 present in amounts ranging from 13 to 24 mole per cent; and an oxide selected from the group which consists of barium oxide, strontium oxide, calcium oxide, magnesium oxide and zinc oxide present in amounts ranging from 6 to 20 mole per cent, all mole percentages being based on the total weight of said glaze composition.

2. A lead-free, vitrifiable ceramic glaze composition suitable for decorating glassware and maturing below about 1150° F. to a glossy, decorative surface coating, said glaze composition comprising aluminum oxide present in amounts ranging from 12 to 17 mole per cent; boric oxide present in amounts ranging from 25 to 40 mole per cent; silica present in amounts ranging from 5 to 25 mole per cent; lithium oxide present in amounts ranging from 13 to 24 mole per cent; and at least one of the oxides selected from the group which consists of barium oxide, strontium oxide, calcium oxide, magnesium oxide, and zinc oxide, present in amounts ranging from 6 to 20 mole per cent; all said percentages being based on the total weight of said glaze composition.

3. A lead-free, vitrifiable ceramic glaze composition suitable for decorating glassware and maturing below about 1150° F. to a glossy, decorative surface coating, said glaze composition comprising aluminum oxide present in amounts ranging from 12 to 17 mole per cent; boric oxide present in amounts ranging from 25 to 40 mole per cent; silica present in amounts ranging from 5 to 25 mole per cent; at least one of the oxides of an alkali metal having an atomic weight below 40 present in amounts ranging from 13 to 24 mole per cent; and barium oxide present in amounts ranging from 6 to 20 mole per cent; all said percentages being based on the total weight of said glaze composition.

4. A lead-free, vitrifiable ceramic glaze composition suitable for decorating glassware and maturing below about 1150° F. to a glossy, decorative surface coating, said glaze composition comprising aluminum oxide present in amounts ranging from 12 to 17 mole per cent; boric oxide present in amounts ranging from 25 to 40 mole per cent; silica present in amounts ranging from 5 to 25 mole per cent; lithium oxide present in amounts ranging from 13 to 24 mole per cent; and barium oxide present in amounts ranging from 6 to 20 mole per cent; all said percentages being based on the total weight of said glaze composition.

5. A lead-free, vitrifiable ceramic glaze composition suitable for decorating glassware and maturing below about 1150° F. to a glossy, decorative surface coating, said glaze composition comprising aluminum oxide present in amounts ranging from 12 to 17 mole per cent; boric oxide present in amounts ranging from 25 to 40 mole per cent; silica present in amounts ranging from 5 to 25 mole per cent; at least one of the oxides of an alkali metal having an atomic weight below 40 present in amounts ranging from 13 to 24 mole per cent; an oxide selected from the group which consists of barium oxide, strontium oxide, calcium oxide, magnesium oxide, and zinc oxide present in amounts ranging from 6 to 20 mole per cent; and titanium dioxide; all said percentages being based on the total weight of said glaze composition.

6. A lead-free, vitrifiable ceramic glaze composition suitable for decorating glassware and maturing below about 1150° F. to a glossy, decorative surface coating, said glaze composition comprising aluminum oxide present in amounts ranging from 12 to 17 mole per cent; boric oxide present in amounts ranging from 25 to 40 mole per cent; silica present in amounts ranging from 5 to 25 mole per cent; lithium oxide present in amounts ranging from 13 to 24 mole per cent; at least one of the oxides selected from the group which consists of barium oxide, strontium oxide, calcium oxide, magnesium oxide, and zinc oxide present in amounts ranging from 6 to 20 mole per cent; and titanium dioxide; all said percentages being by weight based on the weight of composition.

7. A lead-free, vitrifiable, ceramic glaze composition suitable for decorating glassware and maturing below about 1150° F. to a glossy, decorative surface coating, said glaze composition comprising aluminum oxide present in amounts ranging from 12 to 17 mole per cent; boric oxide present in amounts ranging from 25 to 40 mole per cent; silica present in amounts ranging from 5 to 25 mole per cent; lithium oxide present in amounts ranging from 13 to 24 mole per cent; barium oxide present in amounts ranging from 6 to 20 mole per cent; and titanium dioxide; all said percentages being based on the total weight of said glaze composition.

8. A pigmented, lead-free, ceramic glaze composition suitable for decorating glassware and maturing below about 1150° F. to a colored, glossy, decorative surface coating, said glaze composition comprising a ceramic pigment and a frit composition which comprises aluminum oxide present in amounts ranging from 12 to 17 mole per cent; boric oxide present in amounts ranging from 25 to 40 mole per cent; silica present in amounts ranging from 5 to 25 mole per cent; at least one of the oxides of an alkali metal having an atomic weight below 40 present in amounts ranging from 13 to 24 mole per cent; and at least one of the oxides selected from the group which consists of barium oxide, strontium oxide, calcium oxide, magnesium oxide, and zinc oxide present in amounts ranging from 6 to 20 mole per cent; all said percentages being based on the total weight of said glaze composition.

9. A pigmented, lead-free, enamel suitable for decorating glassware and maturing below about 1150° F. to a colored, glossy, decorative surface coating, said enamel comprising a ceramic pigment and a glaze composition which comprises aluminum oxide present in amounts ranging from 12 to 17 mole per cent; boric oxide present in amounts ranging from 25 to 40 mole per cent; silica present in amounts ranging from 5 to 25 mole per cent; lithium oxide present in amounts ranging from 13 to 24 mole per cent; and at least one of the oxides selected from the group which consists of barium oxide, strontium oxide, calcium oxide, magnesium oxide and zinc oxide present in amounts ranging from 6 to 20 mole per cent; all said percentages being based on the total weight of said glaze composition.

10. A pigmented, lead-free, ceramic glaze composition suitable for use in decorating glassware and maturing below about 1150° F. to a colored, glossy, decorative surface coating, said glaze composition comprising a ceramic pigment and a frit composition which comprises aluminum oxide present in amounts ranging from 12 to 17 mole per cent; boric oxide present in amounts ranging from 25 to 40 mole per cent; silica present in amounts ranging from 5 to 25 mole per cent; lithium oxide present in amounts ranging from 13 to 24 mole per cent; and barium oxide present in amounts ranging from 6 to 20 mole per cent; all said percentages being based on the total weight of said glaze composition.

11. An opaque, lead-free, ceramic glaze composition suitable for use in decorating glassware and maturing below about 1150° F. to an opaque, glossy, decorative surface coating, said glaze composition comprising a ceramic opacifying agent and a frit composition which comprises aluminum oxide present in amounts ranging from 12 to 17 mole per cent; boric oxide present in amounts ranging from 25 to 40 mole per cent; silica present in amounts ranging from 5 to 25 mole per cent; at least one of the oxides of an alkali metal having an atomic weight below 40 present in amounts ranging from 13 to 24 mole per cent; and an oxide selected from the group which consists of barium oxide, strontium oxide, calcium oxide, magnesium oxide, and zinc oxide present in amounts ranging from 6 to 20 mole per cent; all said percentages being based on the total weight of said glaze composition.

12. An opaque, lead-free ceramic glaze composition suitable for use in decorating glassware and maturing below about 1150° F. to an opaque, glossy, decorative surface coating, said glaze composition comprising a ceramic opacifying agent and a frit composition which comprises aluminum oxide present in amounts ranging from 12 to 17 mole per cent; boric oxide present in amounts ranging from 25 to 40 mole per cent; silica present in amounts ranging from 5 to 25 mole per cent; lithium oxide present in amounts ranging from 13 to 24 mole per cent; and at least one of the oxides selected from the group which consists of barium oxide, strontium oxide, calcium oxide, magnesium oxide and zinc oxide present in amounts ranging from 6 to 20 mole per cent; all said percentages being based on the total weight of said glaze composition.

13. An opaque, lead-free, ceramic glaze composition suitable for use in decorating glassware and maturing below about 1150° F. to an opaque, glossy, decorative surface coating, said glaze composition comprising a ceramic opacifying agent and a frit which comprises aluminum oxide present in amounts ranging from 12 to 17 mole per cent; boric oxide present in amounts ranging from 25 to 40 mole per cent; silica present in amounts ranging from 5 to 25 mole per cent; at least one of the oxides of an alkali metal having an atomic weight below 40 present in amounts ranging from 13 to 24 mole per cent; and barium oxide present in amounts ranging from 6 to 20 mole per cent; all percentages being based on the total weight of said glaze composition.

14. An opaque, lead-free, ceramic glaze composition suitable for use in decorating glassware and maturing below about 1150° F. to an opaque, glossy, decorative surface coating, said glaze composition comprising a ceramic opacifying agent and a frit composition which comprises aluminum oxide present in amounts ranging from 12 to 17 mole per cent; boric oxide present in amounts ranging from 25 to 40 mole per cent; silica present in amounts ranging from 5 to 25 mole per cent; lithium oxide present in amounts ranging from 13 to 24 mole per cent; and barium oxide present in amounts ranging from 6 to 20 mole per cent; all said percentages being based on total weight of said glaze composition.

15. A decorated, ceramic article which comprises glassware decorated with a pigmented, lead-free, ceramic glaze composition, of a type suitable for use in decorating glassware, which matures below about 1150° F. to a colored, glossy, decorative surface coating, said glaze composition comprising a ceramic pigment, and a frit composition which comprises: aluminum oxide present in amounts ranging from 12 to 17 mole per cent; boric oxide present in amounts ranging from 25 to 40 mole per cent; silica present in amounts ranging from 5 to 25 mole per cent; at least one of the oxides of an alkali metal having an atomic weight below 40 present in amounts ranging from 13 to 24 mole per cent; and at least one of the oxides selected from the group which consists of barium oxide, strontium oxide, calcium oxide, magnesium oxide, and zinc oxide present in amounts ranging from 6 to 20 mole per cent; all said percentages being based on the total weight of said glaze composition.

16. A decorated glassware article which comprises a glass base decorated with a pigmented, lead-free ceramic glaze composition, of a type suitable for decorating glassware, which matures below about 1150° F. to a colored, glossy, decorative surface coating, said glaze composition comprising a ceramic pigment, and a frit composition which comprises: aluminum oxide present in amounts ranging from 12 to 17 mole per cent; boric oxide present in amounts ranging from 25 to 40 mole per cent; silica present in amounts ranging from 5 to 25 mole per cent; lithium oxide present in amounts ranging from 13 to 24 mole per cent; at least one of the oxides selected from the group which consists of barium oxide, strontium oxide, calcium oxide, magnesium oxide, and zinc oxide present in amounts ranging from 6 to 20 mole per cent; all said percentages being based on total weight of said glaze composition.

17. A decorated glassware article which comprises a glass base decorated with a pigmented, lead-free ceramic glaze composition, of a type suitable for use in decorating glassware, which matures below about 1150° F. to a colored, glossy, decorative surface coating, said glaze composition comprising a ceramic pigment, and a frit composition which comprises: aluminum oxide present in amounts ranging from 12 to 17 mole per cent; boric oxide present in amounts ranging from 25 to 40 mole per cent; silica present in amounts ranging from 5 to 25 mole per cent; lithium oxide present in amounts ranging from 13 to 24 mole per cent; and barium oxide present in amounts ranging from 6 to 20 mole per cent; all percentages being based on the total weight of said composition.

ALDEN J. DEYRUP.